(12) United States Patent
Hattori et al.

(10) Patent No.: US 7,413,819 B2
(45) Date of Patent: Aug. 19, 2008

(54) MAGNETIC RECORDING MEDIUM

(75) Inventors: Kazuhiro Hattori, Tokyo (JP); Mitsuru Takai, Tokyo (JP)

(73) Assignee: TDK Corporation, Tokyo (JP)

( * ) Notice: Subject to any disclaimer, the term of this patent is extended or adjusted under 35 U.S.C. 154(b) by 414 days.

(21) Appl. No.: 11/059,532

(22) Filed: Feb. 17, 2005

(65) Prior Publication Data

US 2005/0185561 A1    Aug. 25, 2005

(30) Foreign Application Priority Data

Feb. 23, 2004    (JP)    ............................ 2004-046927

(51) Int. Cl.
*G11B 5/66*    (2006.01)

(52) U.S. Cl. ..................................... 428/836

(58) Field of Classification Search .................. None
See application file for complete search history.

(56) References Cited

U.S. PATENT DOCUMENTS

| | | | | |
|---|---|---|---|---|
| 4,935,278 A | * | 6/1990 | Krounbi et al. | 428/848.5 |
| 6,014,296 A | * | 1/2000 | Ichihara et al. | 360/135 |
| 6,495,240 B1 | * | 12/2002 | Wada et al. | 428/156 |
| 6,583,957 B1 | | 6/2003 | Takeshita et al. | |
| 6,665,145 B2 | * | 12/2003 | Wada | 360/133 |

FOREIGN PATENT DOCUMENTS

| JP | A 01-279421 | 11/1989 |
|---|---|---|
| JP | A 09-097419 | 4/1997 |
| JP | 2000-195042 | 7/2000 |
| JP | A 2000-298822 | 10/2000 |
| JP | A 2000-298823 | 10/2000 |

* cited by examiner

*Primary Examiner*—Holly Rickman
(74) *Attorney, Agent, or Firm*—Oliff & Berridge, PLC (57) ABSTRACT

A magnetic recording medium is provided, which has a recording layer formed in a concavo-convex pattern and makes it possible to obtain the stable flying characteristics of a head. In the magnetic recording medium, concave portions between recording elements are filled with a non-magnetic material. Thus, the surface of the magnetic recording medium takes a concavo-convex shape which is different from the concavo-convex pattern of the recording layer. Also, the arithmetical mean deviation of the assessed profile of the concavo-convex shape in the surface is restricted to 1 nm or less.

11 Claims, 5 Drawing Sheets

MAGNETIC RECORDING MEDIUM

BACKGROUND OF THE INVENTION

1. Field of the Invention

The present invention relates to a magnetic recording medium which has a recording layer formed in a concavo-convex pattern.

2. Description of the Related Art

Conventionally, a magnetic recording medium such as a hard disc has been significantly increased in areal density by means of improvement such as fining magnetic particles forming a recording layer, material changes, and increased precision in the processing of heads. Further increase in the areal density is expected in the future.

However, problems such as a limitation in the processing of the head, side fringes due to the spread of a magnetic field, and crosstalk have become revealed, so that improvements in the areal density by a conventional improvement method has reached their limitations. Thus, a magnetic recording medium such as a discrete track medium and a patterned medium has been proposed as a candidate for a magnetic recording medium which can realize further increase in the areal density (refer to, for example, Japanese Patent Laid-Open Publication No. Hei 9-97419). In such a magnetic recording medium, a recording layer is formed in a predetermined concavo-convex pattern.

Namely, since information is recorded on convex portions of the concavo-convex pattern, it is possible to restrain a side fringe, crosstalk, and the like between a convex portion and another convex portion adjacent thereto. Forming the recording layer in the concavo-convex pattern also has the effect of preventing a magnetic head from adhering to the surface of the magnetic recording medium.

When the surface of the medium is in the concavo-convex pattern, on the other hand, there are cases where recording and reproducing characteristics become worse because of the instability of the flying height of the head. Accordingly, it is considered to deposit a non-magnetic material over the recording layer in the concavo-convex pattern for the purpose of filling concave portions with the non-magnetic material. Then, an excess part of the non-magnetic material above the recording layer is removed to flatten the surface of the magnetic recoding layer.

A method of dry etching is available as a method for processing the recording layer into the concavo-convex pattern. A deposit technology such as sputtering, which is used in the field of semiconductor manufacturing, is available as a method for depositing the non-magnetic material. Also, a processing technology such as CMP (chemical mechanical polishing), which is used in the field of semiconductor manufacturing, is available as a method for removing the excess part of the non-magnetic material above the recording layer to flatten the surface.

It is difficult, however, to completely flatten the surface even if the CMP method or the like is used. A concavo-convex shape in which the concavo-convex pattern of the recording layer is reflected is formed in the surface. In the CMP method, for example, it is difficult to precisely control the amount (thickness) of processing in the order of nanometers. Thus, there are cases where after the non-magnetic material above the recording layer is removed, a part of the recording layer is removed together with the non-magnetic material, and hence difference in the height of the concavo-convex shape in the surface, in which the concavo-convex pattern of the recording layer is reflected, contrarily increases due to difference in the speed of processing of both.

There are cases that the stable flying characteristics of the head cannot be obtained due to such a concavo-convex shape in the surface.

SUMMARY OF THE INVENTION

In view of the foregoing problems, various exemplary embodiments of this invention provide a magnetic recording medium which has a recording layer formed in a concavo-convex pattern, and the stable flying characteristics of a head.

To solve the foregoing problems, according to the various exemplary embodiments of the present invention, the surface of a magnetic recording medium takes a concavo-convex shape which is different from a concavo-convex pattern of a recording layer. Also, the arithmetical mean deviation of the assessed profile of the concavo-convex shape in the surface is restricted to 1 nm or less.

In the process of reaching the various exemplary embodiments of the present invention, the present inventors found out that not only the amount of surface roughness of a magnetic recording medium but also the concavo-convex shape of the surface of the magnetic recording medium, in which a concavo-convex pattern of a recording layer was reflected, caused instability in the flying of a head.

To be more specific, data regions and servo regions are alternately and periodically provided in a moving direction of the head in the magnetic recording medium. Concavo-convex patterns of both regions are reflected in the concavo-convex shape of the surface, so that the flying height of the head periodically varies. Thus, there are cases where the head behaves like resonance, and flying characteristics become unstable. The head also carries out seek operation by moving in a radial direction of the magnetic recording medium. Recording elements are intermittently formed in the radial direction in the data region, and the concavo-convex shape of the surface, in which the concavo-convex pattern of the recoding layer is reflected, has a periodic pattern in the radial direction. Also in this case, the flying height of the head periodically varies, and the head behaves like resonance. Thus, the flying characteristics may become unstable.

As compared with it, processing the surface of the magnetic recording medium into the concavo-convex shape which is different from the concavo-convex pattern of the recording layer makes it possible to restrain periodic variation in the flying height of the head. In other words, the concavo-convex pattern of the recording layer was conventionally reflected in the concavo-convex shape of the surface of the magnetic recording medium, when the recording layer was formed in the concavo-convex pattern. However, processing the surface of the magnetic recording medium into the concavo-convex shape which is different from the concavo-convex pattern of the recording layer makes it possible to improve the flying characteristics of the head.

In the magnetic recording medium with high areal density to which the present invention is applied, it is assumed that the flying height of the head is 10 nm or less. Thus, the maximum difference in height (maximum height) in the surface of the magnetic recording medium has to be restricted to 10 nm or less. However, it is verified from experience that the maximum difference in height in the surface is approximately ten times as large as the arithmetical mean deviation of the assessed profile of the surface. Accordingly, the favorable flying characteristics of the head can be certainly obtained by restricting the arithmetical mean deviation of the assessed profile of the surface to 1 nm or less.

When the arithmetical mean deviation of the assessed profile of the surface is excessively small, the head tends to adhere to the surface of the magnetic recording medium. Thus, it is preferable that the arithmetical mean deviation of the assessed profile of the surface should be 0.3 nm or more.

Accordingly, various exemplary embodiments of the present provide a magnetic recording medium having a substrate and a recording layer formed in a predetermined concavo-convex pattern over the substrate, wherein concave portions of the concavo-convex pattern are filled with a non-magnetic material and the surface of the medium takes a concavo-convex shape which is different from the concavo-convex pattern of the recording layer, and an arithmetical mean deviation of the assessed profile of the concavo-convex shape in the surface is restricted to 1 nm or less.

The phrase of "a magnetic recording medium in which a recording layer is formed in a predetermined concavo-convex pattern" used in this application refers not only to a magnetic recording medium which has a recording layer divided into a number of recording elements, but also to a magnetic recording medium in which a recording layer is partly divided so as to continue a part thereof, a magnetic recording medium in which a recording layer is formed continuously to a part of a substrate like a recording layer in a spiral shape, and a magnetic recording medium having a continuous recording layer in which both of a convex portion and a concave portion are formed.

The term "magnetic recording medium" used in this application means to include a magneto-optical recording medium such as an MO (magnet optical) which uses both of magnetism and light, and a heat assisted recording medium using both of magnetism and heat, in addition to a hard disc, a floppy (registered trademark) disc, a magnetic tape, and the like which use only magnetism for recording and reading information.

The term "arithmetical mean deviation of the assessed profile" used in this application means an arithmetical mean deviation of the assessed profile defined by JIS-B0601-2001.

The phrase "convex portion of a concavo-convex pattern" used in this application means a protruding portion of a concavo-convex shape in a cross section orthogonal to the surface.

The term "material in a microcrystalline state" used in this application means a material which does not have a crystalline peak in X-ray diffraction.

According to various exemplary embodiments of the present invention, since the surface of the magnetic recording medium takes the concavo-convex shape which is different from the concavo-convex pattern of the recording layer, it is possible to restrain periodic variation in the flying height of the head. Furthermore, since the arithmetical mean deviation of the assessed profile of the surface is restricted to 1 nm or less, it is possible to certainly obtain the favorable flying characteristics of the head. Since the arithmetical mean deviation of the assessed profile of the surface is also restricted to 0.3 nm or more, it is possible to prevent the adhesion of the head.

BRIEF DESCRIPTION OF THE DRAWINGS

Various exemplary embodiments of the present invention will be described in detail with reference to the accompanying drawings, wherein.

DETAILED DESCRIPTION OF THE PREFERRED EMBODIMENT

Various exemplary embodiments of this invention will be hereinafter described in detail with reference to the drawings.

Figure 1:
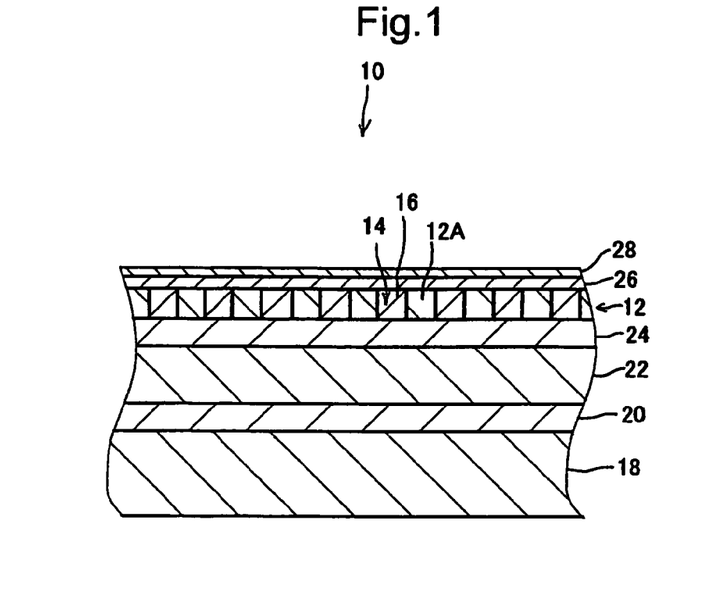
FIG. 1 is a schematic cross-sectional side view showing the structure of a magnetic recording medium according to an exemplary embodiment of the present invention.

Referring to FIG. 1, a magnetic recording medium 10 according to this exemplary embodiment is a perpendicular recording discrete track magnetic disc. A recording layer 12 formed in a concavo-convex pattern is divided into a number of recording elements 12A, which compose convex portions.

Figure 2:
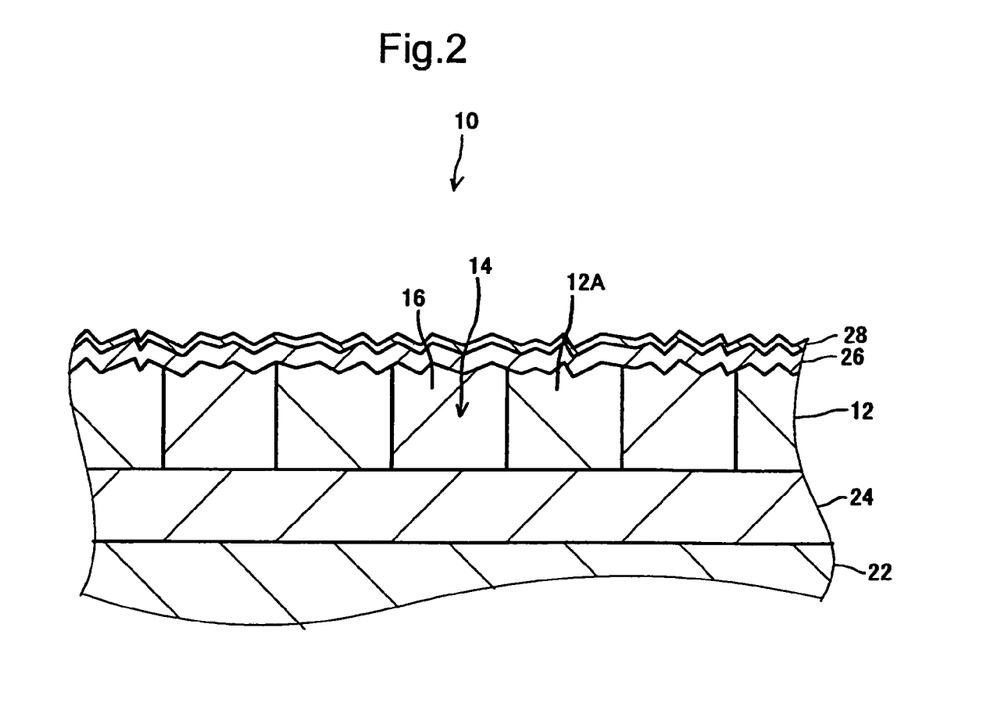
FIG. 2 is a schematic cross-sectional side view showing the structure of the magnetic recording medium under magnification.

In the magnetic recording medium 10, as shown in FIG. 2 under magnification, concave portions 14 between the recording elements 12A are filled with a non-magnetic material 16. The surface takes a concavo-convex shape which is different from the concavo-convex pattern of the recording layer 12. Also, the arithmetical mean deviation of the assessed profile of the concavo-convex shape in the surface is restricted to 1 nm or less. The structure other than these does not seem so important to understand this exemplary embodiment, so that the description thereof will be properly omitted.

In the magnetic recording medium 10, an underlayer 20, a soft magnetic layer 22, and a seed layer 24 are formed over a glass substrate 18 in this order. The recording layer 12 in the concavo-convex pattern is formed on the seed layer 24. A protective layer 26 and a lubricating layer 28 are formed over the recording layer 12 in this order.

The recording layer 12 having a thickness of 5 to 30 nm is made of a CoCr (cobalt-chromium) alloy. The recording layer 12 forms only convex portions of the concavo-convex pattern. The recording elements 12 composing the convex portions are concentrically formed in a radial direction of a track at minute intervals in a data region, and are formed by a pattern of predetermined servo information or the like in a servo region. The top face of the recording layer 12 is exposed from the non-magnetic material 16.

The data regions and the servo regions are alternately provided in a peripheral direction, and the concavo-convex pattern in the recording layer 12 is periodic in the peripheral direction. The recording elements 12A are concentrically formed in the radial direction at the minute intervals in the data region. Therefore, the concavo-convex pattern of the recording layer 12 is periodic in the radial direction in the data region.

The non-magnetic material 16 is $SiO_2$ (silicon dioxide). The non-magnetic material 16 is deposited onto the convex portions of the concavo-convex pattern of the recording layer 12, and the top faces of the recording elements 12A are exposed from the non-magnetic material 16.

The underlayer 20 having a thickness of 30 to 200 nm is made of Ta (tantalum), Cr (chromium), or a Cr alloy. The soft magnetic layer 22 having a thickness of 50 to 300 nm is made of an Fe (iron) alloy, or a Co (cobalt) alloy. The seed layer 24 having a thickness of 3 to 30 nm is made of Cr, Ru (ruthenium), a non-magnetic material such as a CoCr alloy, Ti (titanium), and MgO (magnesium oxide) or the like.

The protective layer 26 having a thickness of 1 to 5 nm is made of a hard carbon film called diamond-like carbon. In this application, the term "diamond-like carbon (hereinafter called "DLC")" is used as the meaning of a material which is mainly composed of carbon, has amorphous structure, and has a hardness of approximately 200 to 8000 kgf/mm$^2$ measured by a Vickers hardness test. The lubricating layer 28 having a thickness of 1 to 2 nm is made of PFPE (perfluoropolyether).

In the magnetic recording medium 10, the surface of the lubricating layer 28 takes the concavo-convex shape which is different from the concavo-convex pattern of the recording layer 12 (not corresponding to a period of the concavo-convex pattern of the recording layer 12). Also, the arithmetical mean deviation of the assessed profile of the surface of the lubricating layer 28 is restricted to 1 nm or less. The arithmetical mean deviation of the assessed profile of the surface of the lubricating layer 28 is also restricted to 0.3 nm or more.

Next, the operation of the magnetic recording medium 10 will be described.

In the magnetic recording medium 10, since information is recorded on the recording elements 12A composing the convex portions of the concavo-convex pattern, it is possible to restrain a side fringe, crosstalk, and the like between a recording element 12A and another recording element 12A adjacent thereto. Accordingly, it is possible to increase areal density.

Especially, the recording elements 12A form only the convex portions of the concavo-convex pattern in the recording layer 12, so that magnetic noise does not occur from the concave portions. Therefore, it is possible to improve recording and reproducing characteristics.

Since the top face of the recording layer 12 is exposed from the non-magnetic material 16, spacing loss between the recording layer 12 and the head is reduced. Therefore, it is also possible to improve the recording and reproducing characteristics in this respect.

The surface of the magnetic recording medium 10 is processed into the concavo-convex shape which is different from the concavo-convex pattern of the recording layer 12. Therefore, it is possible to restrain periodic variations in the flying height of the head.

Furthermore, the arithmetical mean deviation of the assessed profile of the surface of the magnetic recording medium 10 is restricted to 1 nm or less, and the maximum difference in height in the surface is restrained to 10 nm or less, which is approximately 10 times as large as the arithmetical mean deviation of the assessed profile of the surface. Thus, if the average flying height of the head is 10 nm or less, it is possible to certainly obtain favorable flying characteristics of the head.

Figure 10:
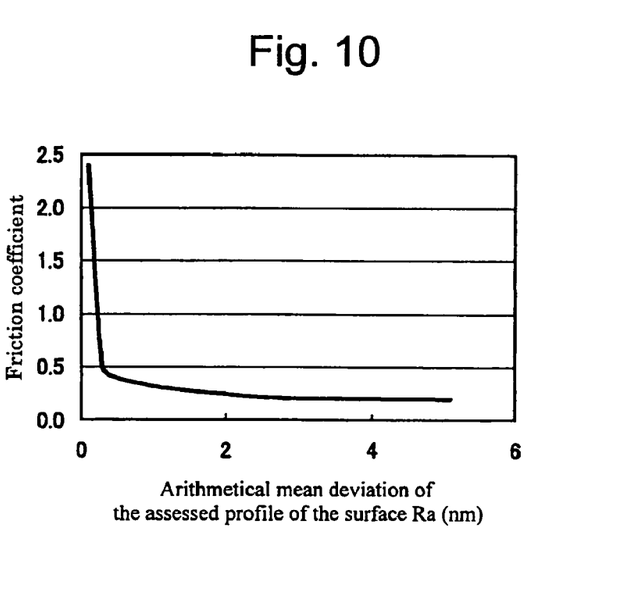
FIG. 10 is a graph showing the relation between the arithmetical mean deviation of the assessed profile of a surface and a friction coefficient between the surface and a head, which is obtained by a slide test on the magnetic recording medium.

Referring to a graph of FIG. 10, when the arithmetical mean deviation of the assessed profile of the surface is excessively small, a friction coefficient between the surface and the head becomes excessively large, and hence the head tends to adhere to the surface. In the magnetic recording medium 10, however, the arithmetical mean deviation of the assessed profile of the surface is 0.3 nm or more, so that the friction coefficient between the surface and the head is restricted to 0.5 or less. Therefore, it is possible to prevent the adhesion of the head.

Figure 3:
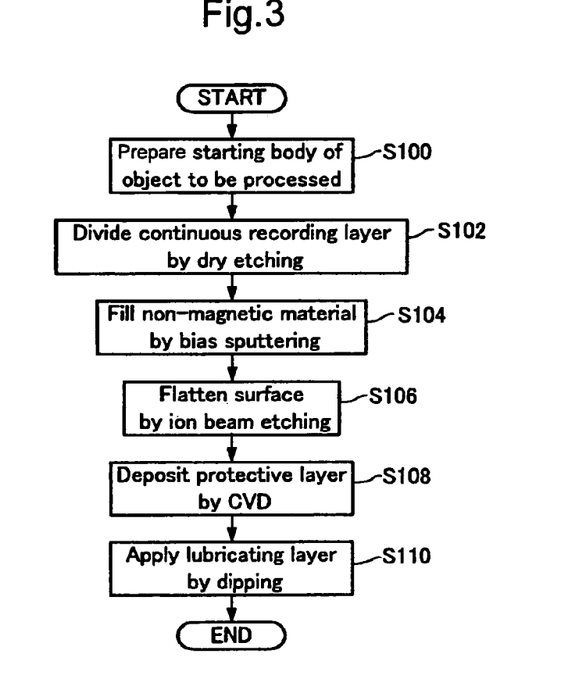
FIG. 3 is a flowchart showing an overview of a manufacturing process of the magnetic recording medium.

Next, a method for manufacturing the magnetic recording medium 10 will be briefly described with reference to a flowchart of FIG. 3.

Figure 4:
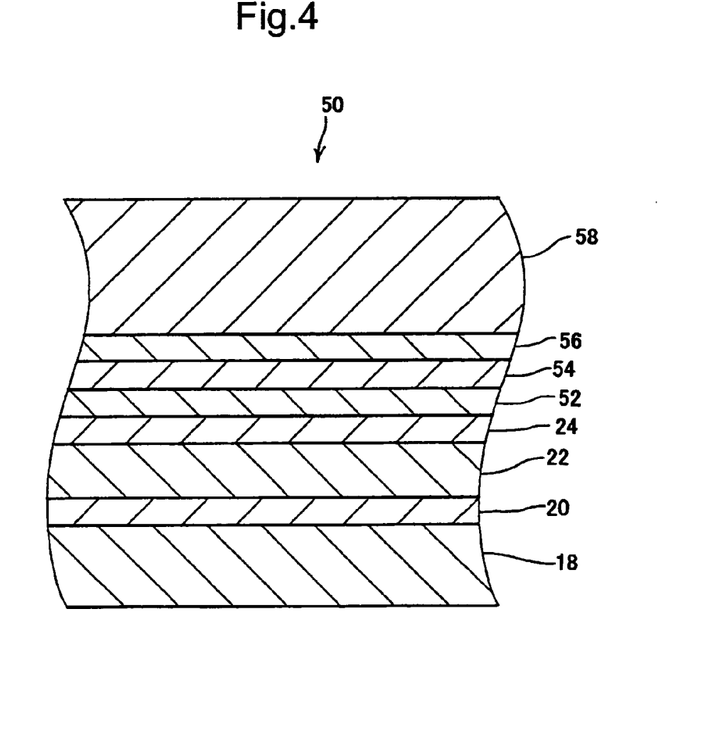
FIG. 4 is a schematic cross-sectional side view showing the structure of a starting body in the manufacturing process of the magnetic recording medium.
Figure 5:
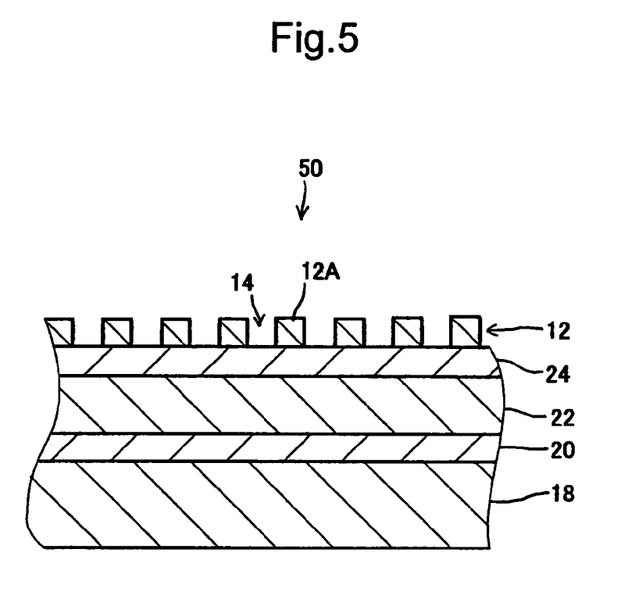
FIG. 5 is a schematic cross-sectional side view showing the shape of an object to be processed, on the surface of which recording elements are formed.

First, by processing a starting body of an object to be processed 50 as shown in FIG. 4, a continuous recording layer 52 is divided into the recording elements 12A to form the recording layer 12 as shown in FIG. 5.

To concretely obtain the starting body of the object to be processed 50, the underlayer 20, the soft magnetic layer 22, the seed layer 24, the continuous recording layer 52, a first mask layer 54, and a second mask layer 56 are formed over the glass substrate 18 in this order by sputtering. Then, a resist layer 58 is applied by spin coating(S100). Alternatively, the resist layer 58 may be applied by dipping. The first mask layer 54 is made of, for example, TiN (titanium nitride). The second mask layer 56 is made of, for example, Ni (nickel).

A predetermined concavo-convex pattern is transferred to the resist layer 58 of the starting body of the object to be processed 50 by nanoimprinting by use of a transfer device (not illustrated). Specifically servo pattern including contact holes is transferred to the servo region, and the concavo-convex pattern at minute intervals in the radial direction is transferred to the data area. Then, the resist layer 58 at the bottom of the concave portions of the concavo-convex pattern is removed by reactive ion etching using $O_2$ gas as a reactive gas. Alternatively, the resist layer 58 may be processed into the concavo-convex pattern by exposure and development.

Then, the second mask layer 56 at the bottom of the concave portions is removed by ion beam etching using Ar (argon) gas, and furthermore the first mask layer 54 at the bottom of the concave portions is removed by reactive ion etching using $SF_6$ (sulfur hexafluoride) gas. The term "ion beam etching" used herein means to include a generic name of a processing method such as ion milling, in which an ionized gas is applied to an object to be processed to remove a material. Thus, the continuous recording layer 52 is exposed at the bottom of the concave portions. Then, the continuous recording layer 52 at the bottom of the concave portions is removed by reactive ion etching with using CO gas and $NH_3$ gas as a reactive gas. Accordingly, the continuous recording layer 52 is divided into a number of recording elements 12A, and thereby the recording layer 12 is formed (S102). Then, the first mask layer 54 remaining on the top faces of the recording elements 12A is completely removed by reactive ion etching using $SF_6$ gas as a reactive gas, and hence the object to be processed 50 as shown in FIG. 5, in which the recording layer 12 in the concavo-convex pattern is formed in its surface, is obtained.

Figure 6:
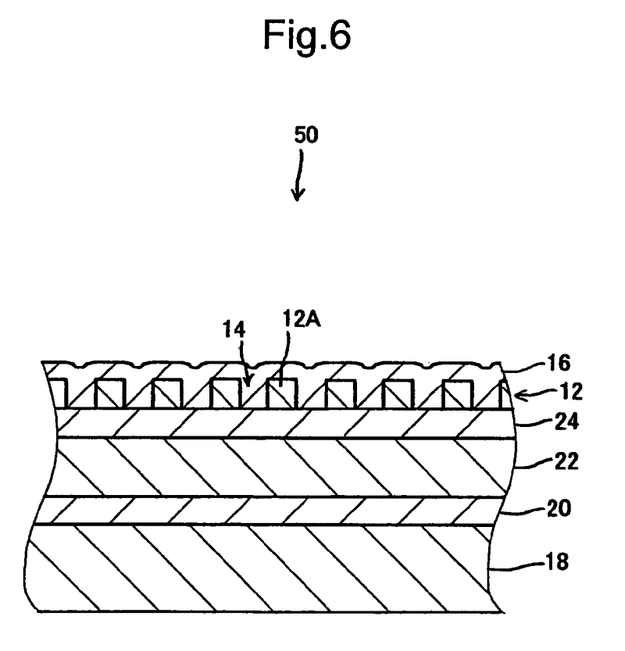
FIG. 6 is a schematic cross-sectional side view showing the shape of the object to be processed, in which a non-magnetic material is deposited over the recording elements and concave portions are filled with the non-magnetic material.

Then, as shown in FIG. 6, particles of $SiO_2$ (non-magnetic material 16) are deposited on the surface of the object to be processed 50 by bias sputtering with applying bias power to the object to be processed 50, in order to fill the concave portions 14 between the recording elements 12A with the non-magnetic material 16 (S104). The non-magnetic material 16 is deposited so as to completely cover the recording elements 12A.

At this time, since a sputtering gas such as Ar collides with a target of $SiO_2$, the particles of $SiO_2$ scatter and tend to be equally deposited on the surface of the object to be processed 50 in accordance with the concavo-convex shape of the recording elements 12A. Therefore, the surface of the non-magnetic material 16 tends to be in the concavo-convex shape.

By applying the bias power to the object to be processed 50, on the other hand, the sputtering gas biased in the direction of the object to be processed 50 collides with the deposited $SiO_2$, and etches a part of the deposited $SiO_2$. This etching operation tends to selectively remove a protruding portion of the deposited $SiO_2$ quicker than the other portions, so that concavo-convex shape in the surface of the non-magnetic material 16 is gradually flattened. These functions advance at the same time in actual fact. Since a deposit function exceeds an etching function, the deposit of the non-magnetic material 16 advances while restraining generation of the concavo-convex shape in the surface.

Accordingly, as shown in FIG. 6, the non-magnetic material 16 is deposited into the restrained concavo-convex shape in the surface. Since the non-magnetic material 16 is made of $SiO_2$, the non-magnetic material is in a microcrystalline state in which grain growth is restrained. Hence the adhesion of the non-magnetic material 16 to the recording element 12A of a magnetic material is improved. By selecting deposit conditions, the non-magnetic material 16 may have an amorphous structure.

Figure 7:
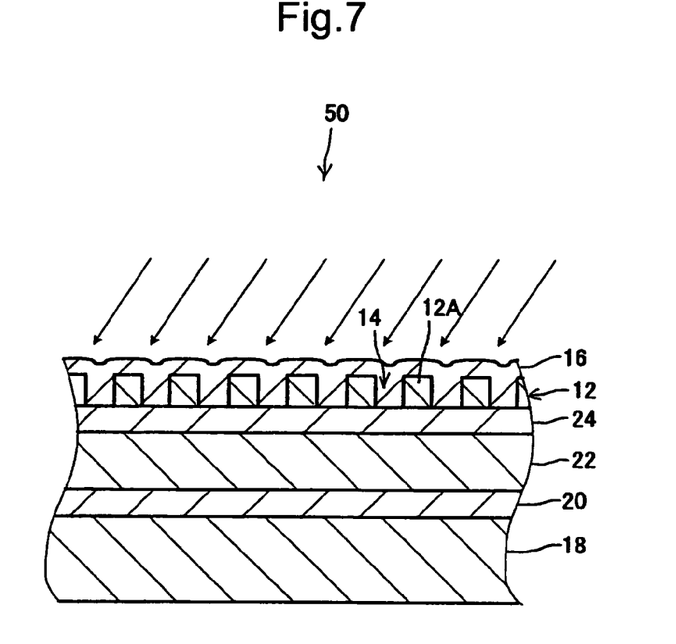
FIG. 7 is a schematic cross-sectional side view showing a flattening process of the object to be processed.
Figure 8:
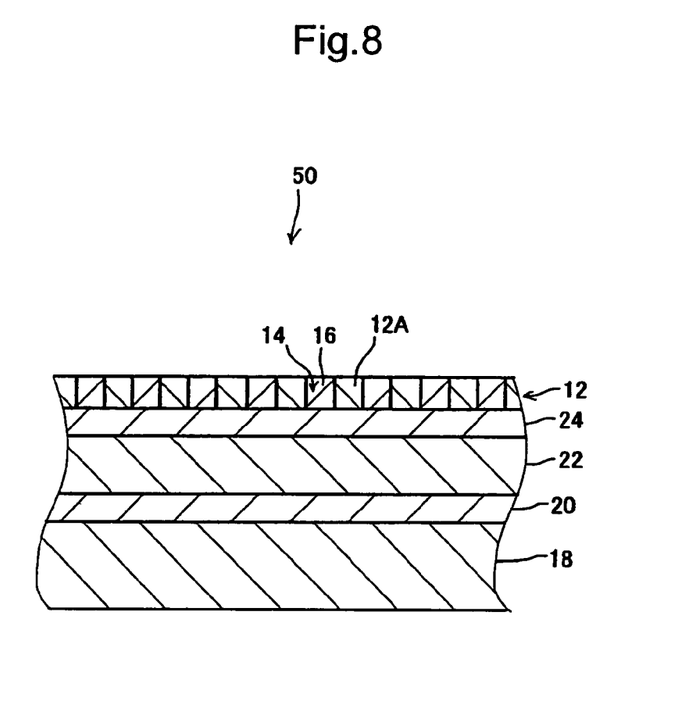
FIG. 8 is a schematic cross-sectional side view showing the shape of the object to be processed after the flattening process.

Then, as shown in FIG. 7, the non-magnetic material 16 is removed up to the top faces of the recording elements 12A by use of ion beam etching, to flatten the surfaces of the recording elements 12A and the non-magnetic material 16 as shown in FIG. 8 (S106). At this time, Ar gas is used as a processing gas of the ion beam etching, and the incident angle of an ion beam is restricted within the range between or equal to 50 and 60 degrees, to remove the non-magnetic material 16 up to the top faces of the recording elements 12A. The term "incident angle" used herein means an angle at which an ion beam is incident upon the surface of the object to be processed, and an angle which the surface of the object to be processed forms with the central axis of the ion beam. For example, when the central axis of the ion beam is in parallel with the surface of the object to be processed, the incident angle is 0 degree. When the central axis of the ion beam is orthogonally incident upon the surface of the object to be processed, and the ion beam is irradiated from the front side of the substrate, the incident angle is +90 degrees. Inclining the incident angle of the ion beam with respect to a direction orthogonal to the surface, as described above, makes it possible to increase the effect of flattening the concavo-convex shape. Accordingly, the concavo-convex shape in which the concavo-convex pattern of the recording layer 12 is reflected is flattened. The concavo-convex shape which is different from the concavo-convex pattern of the recording layer 12 is formed in the top faces of the recording elements 12A and the non-magnetic material 16 as shown in FIG. 2. The arithmetical mean deviation of the assessed profile of the top faces of the recording elements 12A and the non-magnetic material 16 is restricted to 1 nm or less.

Figure 9:
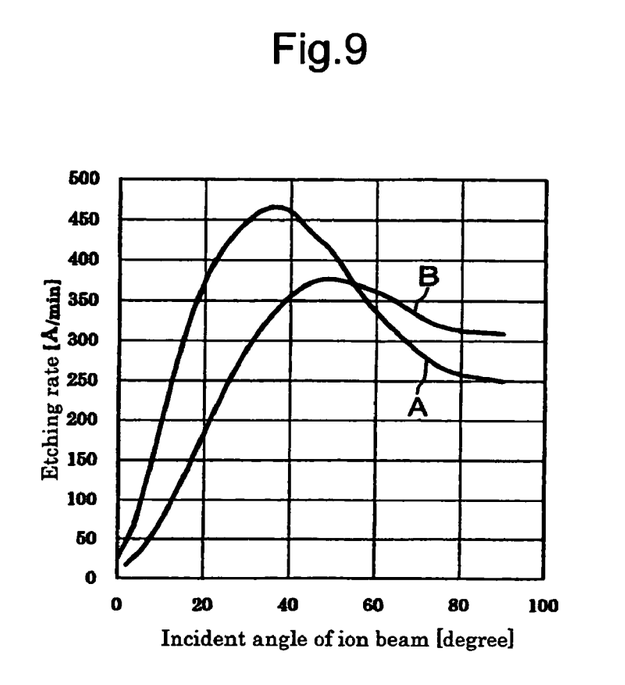
FIG. 9 is a graph which shows the relation between the incident angle of an ion beam and an etching rate when Ar gas is used as a processing gas in the flattening process.

Furthermore, as shown in FIG. 9, the etching rate of $SiO_2$ (non-magnetic material 16) represented by a curve A in the drawing becomes substantially equal to the etching rate of CoCr alloy (recording layer 12) represented by a curve B in the drawing by restricting the incident angle of the ion beam within the foregoing range. Accordingly, if a part of the recording element 12A is removed together with the non-magnetic material 16 after the non-magnetic material 16 above the recording elements 12A is removed, the concavo-convex pattern of the recording layer 12 does not appear again as the concavo-convex shape in the top faces of the recording elements 12A and the non-magnetic material 16. The term "etching rate" used herein means the amount of processing by etching per unit of time.

Since the bias power is applied in a non-magnetic material filling process (S104), the non-magnetic material 16 is deposited in such a manner as to restrain generation of the concavo-convex shape in its surface. Therefore, it is easy to flatten the surface.

Then, the protective layer 26 is formed on the top faces of the recording elements 12A and the non-magnetic material 16 by a CVD (chemical vapor deposition) method (S108). Furthermore, a material of the lubricating layer 28 is applied on the protective layer 26 by dipping (S110). Thus, the magnetic recording medium 10 as shown in FIG. 1 is completed.

As described above, the non-magnetic material 16 is deposited while restraining the concavo-convex in the surface by applying the bias power. Furthermore, the incident angle of the ion beam is restricted so as to substantially equalize the etching rate of the recording elements 12A with that of the non-magnetic material 16 in the ion beam etching. Accordingly, it is possible to form the concavo-convex shape, which has an arithmetical mean deviation of the assessed profile of 1 nm or less and is different from the concavo-convex pattern of the recording layer 12, in the top faces of the recording elements 12A and the non-magnetic material 16. Thus, the surface of the lubricating layer 28 has the same shape.

In this exemplary embodiment, the non-magnetic material 16 is deposited by bias sputtering. The non-magnetic material 16, however, may be deposited by another deposition method such as, for example, ion beam deposition and plasma CVD. Also in this case, it is possible to obtain the effect of restraining the concavo-convex shape in the surface by applying the bias power to the object to be processed. The non-magnetic material 16, on the other hand, may be deposited by a deposition method without applying the bias power, as long as the surface is sufficiently flattened in a flattening process (S106).

In this exemplary embodiment, Ar gas is used as the processing gas of the ion beam etching. Another inert gas such as Kr (krypton) and Xe (xenon), or a halogen-containing gas such as $C_2F_6$ (ethane hexafluoride), $SF_6$ (sulfur hexafluoride), and $CF_4$ (carbon tetrafluoride) may be used as the processing gas instead. A chlorine-containing gas is available as the halogen-containing gas instead of a fluorine-containing gas, but it is preferable to use the fluorine-containing gas because a remaining processing gas is easily cleaned.

In this exemplary embodiment, the incident angle of the ion beam is restricted within the range between or equal to 50 and 60 degrees. The incident angle of the ion beam is properly adjustable in accordance with a type of processing gas and the materials of the recording layer 12 and the non-magnetic material 16, in such a manner as to substantially equalize the etching rate of the recording layer 12 with that of the non-magnetic material 16.

The foregoing flattening method is just an example of a manufacturing method of a magnetic recording medium according to the present invention. A manufacturing method is not especially limited to the foregoing exemplary embodiment, as long as the surface is processed into the concavo-convex shape which is different from the concavo-convex pattern of the recording layer, and the arithmetical mean deviation of the assessed profile is restricted to 1 nm or less. Using the foregoing method may excessively decrease surface roughness to the extent where the head adheres thereto easily. In such a case, it is possible to increase the surface roughness to the extent where the head does not adhere thereto by adjusting, for example, the etching conditions such as the incident angle of the processing gas, as a finish of the flattening process.

In this exemplary embodiment, the first mask layer 54, the second mask layer 56, and the resist layer 58 are formed over the continuous recording layer 52, and the continuous recording layer 52 is divided by three steps of dry etching. The materials, number of layers, and thickness of the resist layer and mask layers, a type of dry etching, and the like are not especially limited as long as the continuous recording layer 52 is processed into the desired concavo-convex pattern.

In this exemplary embodiment, the recording layer 12 (continuous recording layer 52) is made of a CoCr alloy. The present invention, however, is applicable to the processing of a magnetic recording medium which is composed of recording elements made of another material such as, for example, another alloy including iron group elements (Co, Fe (iron), and Ni) and a layered product thereof.

In this exemplary embodiment, the non-magnetic material 16 is made of the $SiO_2$. The non-magnetic material maybe made of another oxide, nitride such as TiN (titanium nitride), carbide such as SiC (silicon carbide) and TiC (titanium carbide), or another non-magnetic material such as Ta (tantalum), TaSi, and Si. Such a non-magnetic material such as oxides, nitrides, and carbides is superior in the chemical stability of itself, and also is superior in chemical stability with respect to corrosion due to contact with the recording layer 12 made of a metallic magnetic material. Accordingly, it is possible to obtain favorable recording and reproducing characteristics.

A defect such as grain boundary of a magnetic deposit tends to occur in the side faces of the recording element 12A because of the effect of processing of the continuous recording layer 52. It is difficult to fill such a defect with a crystalline material with grain boundary. However, when a non-crystalline material with an amorphous structure without grain boundary is used as a material of the non-magnetic material 16, it is possible to fill the defect in the side faces of the recording element 12A with the non-magnetic material 16 for protection.

In this exemplary embodiment, the underlayer 20, the soft magnetic layer 22, and the seed layer 24 are formed under the continuous recording layer 52. The structure of layers under the continuous recording layer 52 is properly changeable in accordance with a type of magnetic recording medium. For example, one or two layers of the underlayer 20, the soft magnetic layer 22, and the seed layer 24 may be omitted. Alternatively, each layer may be composed of a plurality of layers. Alternatively, the continuous recording layer may be directly formed on the substrate.

In this exemplary embodiment, the magnetic recording medium 10 is a perpendicular recording discrete track magnetic disc, in which the recording elements 12A are arranged in the radial direction of the track at the minute intervals in the data region. The present invention, as a matter of course, is applicable to manufacturing a magnetic disc in which recording elements are arranged in a peripheral direction of a track (in the direction of a sector) at minute intervals, a magnetic disc in which recording elements are arranged in parallel in both of a radial direction and a peripheral direction of a track at minute intervals, a PERM (pre-embossed recording medium) type magnetic disc having a continuous recording layer formed in a concavo-convex pattern, and a magnetic disc in which a track is formed in a spiral shape. Various exemplary embodiments of the present invention are also applicable to a longitudinal recording type magnetic disc. The present invention is also applicable to manufacturing a magneto-optical disc such as an MO, a heat assisted magnetic disc using both of magnetism and heat, and another magnetic recording medium in a shape other than a disc such as a magnetic tape which has a recording layer in a concavo-convex pattern.

EXAMPLE

The magnetic recording medium 10 was manufactured in a way of the foregoing exemplary embodiment. To be more specific, the recording layer 12 was formed into the following concavo-convex pattern.

Pitch: 150 nm
Width of convex portion: 95 nm
Width of concave portion: 55 nm
Difference in the height between concave and convex: 20 nm
Arithmetical mean deviation of the assessed profile Ra: 2.50 nm Then, the non-magnetic material 16 was deposited to a thickness of approximately 40 nm in the non-magnetic material filling process (S104) under the following conditions, to fill the concave portions 14 with the non-magnetic material 16. The thickness of the non-magnetic material 16 described above is equal to the distance between the most projecting portion in the surface of the deposited non-magnetic material 16 and the top face of the recording layer 12.

Input power: 500 W
Ar gas pressure: 0.3 Pa
Bias power: 250 W

Then, the non-magnetic material 16 above the recording elements 12A was completely removed in the flattening process (S106) under the following conditions. Both of the etching rates of the non-magnetic material 16 ($SiO_2$) and the recording element 12A under these conditions are approximately 370 angstroms/min.

Quantity of flow of Ar gas: 11 sccm
Gas pressure: 0.05 Pa
Beam voltage: 500 V
Beam current: 500 mA
Suppressor voltage: 400 V
Incident angle of ion beam: +55 degrees After the flattening process (S106), the surfaces of the recording layer 12 and the non-magnetic material 16 were observed by an AFM (atomic force microscope). A concavo-convex shape in which the concavo-convex pattern of the recording layer was reflected did not appear. Surface roughness was as follows.

Arithmetical mean deviation of the assessed profile Ra: 0.41 nm
Maximum height Rmax: 4.02 nm In other words, according to this exemplary embodiment, the concavo-convex shape in which the concavo-convex pattern of the recording layer is reflected does not appear in the surface of the magnetic recording medium. The arithmetical mean deviation of the assessed profile is restricted to 1 nm or less, and the maximum difference in height is restricted to 10 nm or less. Thus, the favorable flying characteristics of the head are obtained. According to this exemplary embodiment, since the arithmetical mean deviation of the assessed profile of the surface is 0.3 nm or more, it is possible to prevent the adhesion of the head.

The present invention is applicable to a magnetic recording medium such as, for example, a discrete track medium and a patterned medium in which a recording layer is formed in a concavo-convex pattern.

What is claimed is:

1. A magnetic recording medium having a substrate and a recording layer formed in a predetermined concavo-convex pattern which includes a periodic pattern over the substrate, wherein
concave portions of the concavo-convex pattern are filled with a non-magnetic material and the surface of the medium takes a concavo-convex shape which is different from the concavo-convex pattern of the recording layer, a period of the concavo-convex shape in the surface does not correspond to a period of the concavo-convex pattern of the recording layer, and
an arithmetical mean deviation of the assessed profile of the concavo-convex shape in the surface is restricted within a range of 0.3 to 1 nm.

2. The magnetic recording medium according to claim 1, wherein
an arithmetical mean deviation of the assessed profile of the concavo-convex pattern of the recording layer is greater than 1 nm.

3. The magnetic recording medium according to claim 1, wherein
the top face of the recording layer is exposed from the non-magnetic material.

4. The magnetic recording medium according to claim 2, wherein
the top face of the recording layer is exposed from the non-magnetic material.

5. The magnetic recording medium according to claim 1, wherein
the non-magnetic material is any one selected from the group consisting of oxides, nitrides, and carbides.

6. The magnetic recording medium according to claim 2, wherein
the non-magnetic material is any one selected from the group consisting of oxides, nitrides, and carbides.

7. The magnetic recording medium according to claim 1, wherein
the non-magnetic material is any of a material having an amorphous structure and a material in a microcrystalline state.

8. The magnetic recording medium according to claim 2, wherein
the non-magnetic material is any of a material having an amorphous structure and a material in a microcrystalline state.

9. The magnetic recording medium according to claim 1, wherein
the non-magnetic material comprises $SiO_2$ as a main component.

10. The magnetic recording medium according to claim 2, wherein
the non-magnetic material comprises $SiO_2$ as a main component.

11. The magnetic recording medium according to claim 1, wherein
the recording layer forms only convex portions of the concavo-convex pattern.

* * * * *